Jan. 16, 1951 G. M. ROSE, JR 2,538,593

SEMICONDUCTOR AMPLIFIER CONSTRUCTION

Filed April 30, 1949

INVENTOR
George M. Rose, Jr.
BY H. W. Newton
ATTORNEY

Patented Jan. 16, 1951 2,538,593

UNITED STATES PATENT OFFICE 2,538,593

SEMICONDUCTOR AMPLIFIER CONSTRUCTION

George M. Rose, Jr., East Orange, N. J., assignor to Radio Corporation of America, a corporation of Delaware Application April 30, 1949, Serial No. 90,702

17 Claims. (Cl. 175—366)

This invention relates generally to semi-conductor devices, and particularly relates to the construction of a three-electrode semi-conductor amplifier or oscillator and of its point electrodes as well as to a novel method of preparing the point electrodes.

A recent amplifier which does not include a vacuum tube utilizes a three-electrode semi-conductor. This device, which has been termed a "transistor," has been disclosed in a series of three letters to the Physical Review by Bardeen and Brattain, Brattain and Bardeen, and Shockley and Pearson which appear on pages 230 to 233 of the July 15, 1948, issue. The new amplifier includes a block of a semi-conducting material such as silicon or germanium which is provided with two closely adjacent point electrodes called "emitter" and "collector" electrodes in contact with one surface region of the material, and a "base" electrode which provides a large-area, low-resistance contact with another surface region of the semi-conducting material.

The new semi-conductor device may be used not only as an amplifier but also as an oscillator and for like purposes. The emitter and collector electrodes may consist of point electrodes which are spaced apart a predetermined distance. The spacing, generally two mils or less, between point electrodes is critical and determines to a large extent the gain and other characteristics of the device. It is accordingly important that this distance be maintained at a desired value. In the past this has been a difficult problem. The surface of the semi-conducting material or crystal is usually fairly smooth because it is first polished and then etched in the manner explained in the papers referred to, as well as in a recent article by Becker and Shive which appears on pages 215 to 221 of the March 1949 issue of "Electrical Engineering." The point electrodes accordingly may easily slip over the smooth surface of the semi-conducting material. Furthermore, it is essential that a certain pressure be applied between the point electrodes and the semi-conducting material in order to provide proper contact pressure. To this end, the semi-conducting material is usually advanced and pressed against the point electrodes, the longitudinal axes of which form an acute angle with the surface of the material. This, of course, increases the danger that the point electrodes may slip thereby varying their distance from any predetermined or preset value.

It is the principal object of the present invention, therefore, to provide an improved construction of a semi-conductor device suitable for use as an amplifier or oscillator and adapted to be produced in large quantities.

Another object of the invention is to provide an improved semi-conductor device having point electrodes and adjusting and holding means therefor which substantially will tend to maintain a predetermined spacing of the electrodes while permitting a semi-conducting crystal body of the device to be moved relative to the point electrodes to establish the required contact pressure.

A further object of the invention is to provide a novel method of preparing a point electrode for a semi-conductor device, the electrode consisting of a fine elongated tungsten wire, and of providing the wire with a pointed end.

In accordance with the present invention, a semi-conductor device is provided with a body of semi-conducting material and with two or more filamentary electrodes consisting of fine resilient wires which may, for example, be made of tungsten and have pointed contact ends. The two wires are each secured at one end to a support and each comprises two substantially straight portions of differing lengths with a bend forming an acute angle therebetween. The pointed free ends of the wires are spaced apart a relatively short distance, for example, of the order of the wire diameter or less. The arrangement is such that the free ends of the electrodes are presented in spaced relation to a common plane formed by a surface of a semi-conducting crystal when moved between the electrodes toward and into engagement with the pointed ends thereof. With this arrangement, the pointed contact ends of the wire electrodes move along lines which are parallel to the travel of the crystal so that their distance remains substantially constant for the required length of the travel between the crystal and the wires. The electrodes are likewise arranged with the pointed ends extending in the same direction toward the semi-conducting element or body of the device.

The point electrodes may, for example, be prepared by heating the ends of suitable tungsten wires in an oxidizing flame to an extent such that the wire ends are oxidized while simultaneously, a major portion of the formed oxide volatizes. The remaining portion of the oxide is then removed either chemically or in an electrolytic bath and resulting in a sharp point being formed. The wire may then be formed and mounted for use as a contact electrode.

The assembled semi-conductor device is very small and compact and preferably may be protected by a housing which encloses the semi-conductor crystal as well as the filamentary electrodes. The device may be provided with three or more pin contacts which may be electrically connected with the three electrodes of the device and the pin contacts may be arranged to fit a standard subminiature tube socket.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

Figure 1:
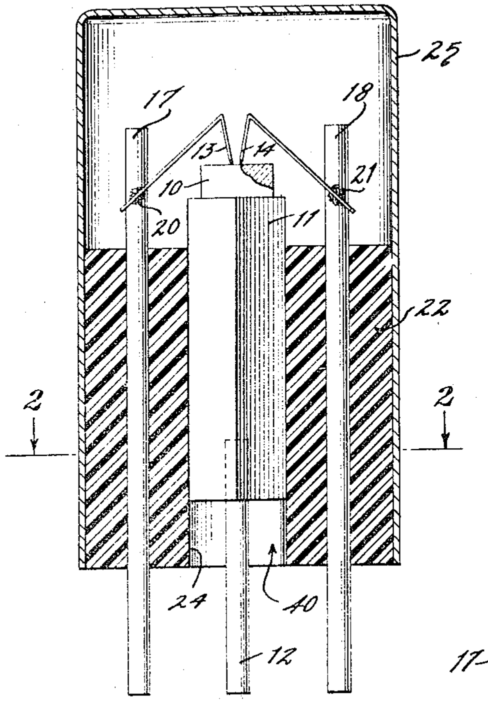
Figure 1 is an elevational view, partly in section, of an assembled three-electrode semi-conductor device embodying the present invention.
Figure 2:
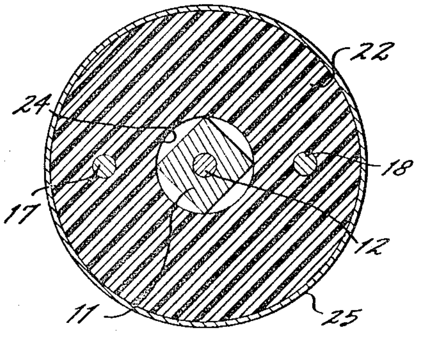
Figure 2 is a cross-sectional view taken on line 2—2 of Figure 1.
Figure 3:
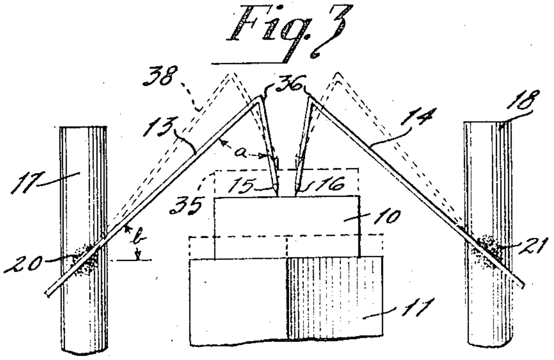
Figure 3 is an elevational view on an enlarged scale of the point electrodes and the semi-conducting crystal and illustrating the position where the electrodes first contact the crystal and another position where the crystal has moved against the electrodes to provide the required contact pressure.

Referring now to Figures 1 to 3 there is illustrated a semi-conductor device in accordance with the present invention including a block 10 of semi-conducting material. Block 10 may, for example, consist of a crystal of boron, silicon, germanium, selenium or tellurium containing a small but sufficient number of atomic impurity centers or lattice imperfections as commonly employed for best results in crystal rectifiers. Germanium is the preferred material for block 10 and may be prepared so as to be an electronic N type semi-conductor as is well known. The surface of block 10 may be polished and etched in the manner explained in the papers referred to.

Block 10 is soldered or sweated to bar 11 which may, for example, consist of brass or any other suitable electric conductor. Bar 11 accordingly represents the base electrode of the amplifier or oscillator. As clearly shown in Figure 2, bar 11 may have a square cross-section. A stiff wire or pin 12 of conducting material such as a heavy nickel wire is soldered or otherwise secured to bar 11 to provide electrical contact with block 10. Semi-conducting block 10, bar 11 and pin 12 form the first sub-assembly of the complete device.

Point electrodes 13 and 14 which represent the emitter and collector electrodes, consist each of a fine, stiff or resilient filament or wire having pointed ends 15, 16 clearly shown in Figure 3. Wires 13 and 14 may consist of tungsten or phosphor-bronze and may have a diameter between 3 and 10 mils. The exact shape of wires 13 and 14 will be described hereinafter.

Wires 13 and 14 are welded to supports 17 and 18 as shown at 20, 21. Supports 17 and 18 may also consist of a heavy nickel wire imbedded in and extending through insulating cylindrical body 22 which may consist, for example, of a suitable plastic material such as Bakelite, Cibanite or Durez. Supports 17 and 18 are preferably molded into cylinder 22. Cylinder 22 is provided with a central cylindrical aperture 24 into which bar 11 may be pressed. The dimensions of aperture 24 and of bar 11 are such that the bar has a press fit with cylinder 22. Preferably, pin 12 and supports 17, 18 are arranged in a common plane as clearly shown in Figure 2 and extend beyond the bottom of cylinder 22 to form pins which fit a standard subminiature tube socket.

Cylinder 22, supports 17, 18 and wires 13, 14 form the second sub-assembly of the complete device. The device preferably is enclosed by housing 25 which may have a cup-shape as shown in Figure 1. Housing 25 may consist of a plastic material or of nickel-plated cold-rolled steel. Housing 25 forms the third sub-assembly of the complete device and may have a press fit with cylinder 22. Housing 25 has the purpose of protecting the semi-conducting block 10 and its point contacts from mechanical damage and from the deleterious action of the air and chemicals contained therein.

Figure 4:
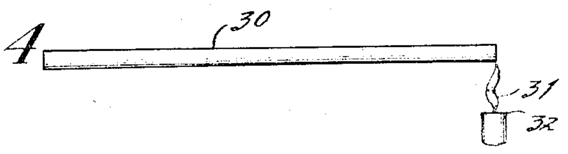
Figure 4 is an elevational view of a tungsten wire being heated in an oxidizing flame.
Figure 5:
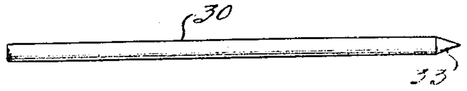
Figure 5 is an elevational view of the treated tungsten wire.

The wires 13, 14 which form the point electrodes of the semi-conductor oscillator or amplifier preferably consist of tungsten and may, for example, have a diameter of three mils. In accordance with the present invention, a wire 30 illustrated in Figure 4 preferably is provided with a pointed end in the following manner. The wire is heated in the oxidizing flame 31 of a Bunsen burner 32 or the like which includes an outer cone having an oxidizing action. The wire is heated in the oxidizing flame 31 to a temperature where it oxidizes. Simultaneously, the major portion of the formed oxide volatilizes due to the high temperature of the flame. The remaining portion of the tungsten oxide is now removed. This may be done by treating the wire with sodium peroxide salts dissolved in water. Preferably, the oxide is removed in an electrolytic bath consisting of an aqueous solution of potassium nitrite. The thus treated wire 30 is shown in Figure 5 and is provided with a pointed end or tip 33. Wire 30 may then be shaped to the form of wires 13, 14.

As pointed out hereinabove, it is essential that the distance between the pointed ends 15 and 16 of the wires 13, 14 be maintained constant. This distance should be of the order of 2 mils or less. Furthermore, a pressure must be developed between wire tips 15, 16 and the substantially flat surface of semi-conducting block 10. To this end bar 11 is pushed upwards in cylinder 22 toward wires 13, 14 until the required pressure has been built up. This will require a travel of approximately 10 mils if wires 13, 14 have a diameter of 3 mils. During this upward movement of block 10 to position 35 shown in dotted lines in Figure 3, wire tips 15, 16 must travel along parallel vertical lines so that their distance remains constant. To this end wires 13 and 14 are each provided with a bend 36 forming an acute angle *a* which may amount to approximately 60 degrees. The portions of the wire between the bend 36 and its free end 15 or 16 and between the bend 36 and its connection to its support (20, 21) are substantially straight. The wires are welded to their supports in such a manner as to form an acute angle *b* with a horizontal line which may amount to approximately 35 degrees. For a tungsten wire of three mil diameter it has been found that the straight portion between points 20 or 21 and bend 36 should be approximately .09 to .1 inch long while the portion of each wire between bend 36 and the tip 15 or 16 may have a length of .035 inch.

With these dimensions it has been found that block 10 may be pressed against wires 13, 14 into position 35 over a length of 20 mils without substantially changing the distance between tips 15, 16. While block 10 is moved and pressed against the wires or bends, each wire flexes to its spring action into the position shown by dotted lines 38.

If a heavier wire is used which may, for example, have a diameter of 7 mils, the amount of travel required to build up the desired contact pressure is considerably reduced because a heavier wire is stiffer than a stronger spring action. The proper shape or dimensions for each type of wire may easily be determined by pushing a glass plate or another material having a smooth surface against the wires and by observing under a microscope whether the distance between the points remains constant over the required length of travel. For the dimensions given hereinabove the wire tips 15, 16 will maintain their distance for a travel of 20 mils.

Wires 13, 14 are shaped and then assembled by means of a jig to provide the proper distance between their tips. Then bar 11 is pushed against the wires until contact is made. This may be determined electrically by connecting a meter between pins 12 and 17 and between pins 12 and 18. Then bar 11 is pushed farther into cylinder 22 the required distance which may amount to 10 mils or less. Finally, housing 25 is put over cylinder 22 and the space 40 between bar 11 and cylinder 22 may be sealed with a suitable sealing wax. The unit is then ready for use.

There has thus been disclosed a novel construction of a three-electrode semi-conductor device suitable for mass production. The construction of the point electrodes is such that the semi-conducting block may be pushed against them to build up the required contact pressure without varying the predetermined distance between the tips of the electrodes.

What is claimed is:

1. A semi-conductor device comprising a semi-conducting body, two resilient filamentary members, each having a free end and a bend forming an acute angle and located intermediate its ends, a support for each of said members, means for maintaining said supports in predetermined spaced relationship, each member being secured to one of said supports in such a manner that said free ends are spaced a predetermined distance, said body being movable towards said members to contact and press against the free ends of said members thereby to provide a desired contact pressure between the members forming the point electrodes and said body, said members being mounted and secured to permit movement of said body toward and away from the free ends of said members a predetermined distance to adjust the contact pressure while maintaining the spacing of the free ends substantially constant, and a further electrode in low-resistance contact with said body.

2. A semi-conductor device comprising a movable semi-conducting body, having a fixed axis of movement, two fine resilient wires, each having a pointed end and a bend forming an acute angle and located intermediate its ends, supporting means for each of said wires spaced with respect to said body and the axis of movement thereof, each wire being secured to one of said supports in such a manner that said pointed ends are spaced a predetermined distance, said body being movable along said axis towards said wires so that it contacts and presses against the pointed ends of said wires to provide a desired contact pressure between the wires forming the point electrodes and said body, said wires being mounted and secured to permit movement of said body toward and away from the free ends of said wires a predetermined distance to adjust the contact pressure while maintaining the spacing of the free ends substantially constant, and a further electrode in low-resistance contact with said body.

3. A semi-conductor device comprising a semi-conducting body having a substantially flat surface, two fine resilient wires, each having a pointed end and a bend forming an acute angle and located intermediate its ends, a support for each of said wires, means for maintaining said supports in predetermined spaced relationship, each wire being secured to one of said supports in such a manner that said pointed ends are located above the points of connection between said wires and their supports and that said pointed ends are spaced a predetermined distance, said body being movable towards said wires so that said surface contacts and presses against the pointed ends of said wires to provide a desired contact pressure between the wires forming the point electrodes and said body, said wires being mounted and secured to permit movement of said body toward and away from the free ends of said wires a predetermined distance to adjust the contact pressure while maintaining the spacing of the free ends substantially constant, and a further electrode in low-resistance contact with said body.

4. A semi-conductor device comprising a semi-conducting body having a substantially flat surface, two fine resilient wire-like members, each having a pointed end and a bend forming an acute angle and provided intermediate its ends and being substantially straight between said bend and their ends, a support for each of said members, means for spacing said supports in a predetermined relationship, each member being secured to one of said supports in such a manner that said pointed ends are located above the points of connection between said members and supports and that said pointed ends are spaced a predetermined distance, said body being movable towards said members so that said surface contacts and presses against the pointed ends of said members to provide the desired contact pressure between the members forming the point electrodes and said body, said members being mounted, dimensioned and secured to permit movement of said body toward and away from the free ends of said members a predetermined distance to adjust the contact pressure while maintaining the spacing of the free ends substantially constant, and a further electrode in low-resistance contact with said body.

5. In a semi-conductor device of the type having two point electrodes, two supports, a member for maintaining said supports in spaced relationship, two resilient filamentary elements, each having one end secured to one of said supports, the free end of each of said elements being pointed, each of said elements having a bend forming an acute angle, the remaining portions of said elements being substantially straight, the angle of said bends and the angle which each element forms with its support and the relative lengths of said element portions being chosen in such a manner that said pointed ends are spaced a predetermined distance and that said distance remains substantially constant while said straight portions flex when said elements are pressed against a surface to provide a predetermined pressure between the surface and said pointed ends.

6. In a semi-conductor device of the type having two point electrodes, a body of insulating material, two metallic supports imbedded in and extended through said body, two fine resilient wires, each having one end secured to one of said supports, the free end of each of said wires being pointed, each of said wires having a bend forming an acute angle intermediate its ends, the remaining portions of said wires being substantially straight, the angle of said bend and the angle which each wire forms with its support and the relative lengths of said wire portions being chosen in such a manner that said pointed ends are spaced a predetermined distance of the order of the thickness of said wires and that said distance remains substantially constant while said straight portions flex when said wires are pressed against a surface to provide a predetermined pressure between the surface and said pointed ends.

7. In a semi-conductor device of the type having a plurality of point electrodes, a body, a plurality of supports imbedded in and extended through said body, a plurality of fine resilient wires, each having one end secured to one of said supports, the free end of each of said wires being pointed, each of said wires having a bend forming an acute angle intermediate its ends, the remaining portions of said wires being substantially straight, the angle of said bend and the angle which each wire forms with its support and the relative lengths of said wire portions being chosen in such a manner that said pointed ends are spaced predetermined distances and that said distances remain substantially constant while said straight portions flex when said wires are pressed against a surface to provide a predetermined pressure between the surface and said pointed ends.

8. A semi-conductor device comprising a semiconducting body, a support, a resilient filamentary member secured to said support, said member having a free end and being substantially straight with a bend forming an acute angle and provided intermediate its support and its free end, and means for advancing said body with respect to said free end along a straight line passing through and forming an acute angle with said free end and for maintaining said support and said body at a position where said free end presses with a predetermined force against said body, said member being shaped and dimensioned so that said free end moves substantially along said straight line for at least the length of the desired movement between said body and said support, and a further electrode in low-resistance contact with said body.

9. A semi-conductor device comprising a semiconducting body, a support, a fine resilient wire secured adjacent one end to said support, said wire having a pointed free end and being substantially straight with a bend forming an acute angle intermediate between its supported and its pointed free end, means for moving said body with respect to said pointed end along substantially a straight line passing through and forming an acute angle with said free end for maintaining said support and said body in a position with said free end engaging said body with a predetermined contact pressure, said wire being so shaped and dimensioned that said free end is movable substantially along said straight line for a distance equal to a desired range of movement between said body and said support, and a further electrode in low-resistance contact with said body.

10. A semi-conductor device adapted to provide an amplifier or oscillator and comprising an insulating member having an aperture, a semiconducting body, a metallic bar, said body being secured and electrically connected to said bar, said bar extending through the aperture in said member and in engagement therewith, two elongated supports extending through said member, and a resilient wire being secured to and supported by each of said supports, each of said wires having a pointed end and a bend forming an acute angle and substantially straight portions between said bend and its ends, the angle of said bend and the angle between each wire and its support being so chosen and the relative length of said wire portions being such that the pointed ends of said wires are located above their supporting points and are spaced a predetermined distance which will substantially not vary when said bar is pushed against said pointed ends until said pointed ends exert a predetermined pressure on said body.

11. A semi-conductor device adapted to provide an amplifier or oscillator and comprising an insulating member having a cylindrical aperture, a semi-conducting body, a metallic bar having a square cross-section, said body being secured and electrically connected to said bar, said bar extending through the aperture in said member and having a press fit therewith, two metallic supports imbedded in and extending through said member, said supports being located so that a common plane passes therethrough and through the axis of said bar and a fine resilient wire being secured to and supported by each of said supports, each of said wires having a pointed end and a bend forming an acute angle and substantially straight portions between said bend and its end, the angle of said bend and the angle between each wire and its support being so chosen and the relative length of said wire portions being such that the pointed ends of said wires are located above their supporting points and are spaced a predetermined distance which will substantially not vary when said bar is pushed against said pointed ends until said pointed ends exert a predetermined pressure on said body.

12. A semi-conductor device adapted to provide an amplifier or oscillator and comprising an insulating member having a cylindrical aperture, a semi-conducting body, a metallic bar having a square cross-section, said body being secured and electrically connected to said bar, said bar extending through the aperture in said member and having a press fit therewith, two metallic supports imbedded in and extending through said member, said supports being located so that a common plane passes therethrough and through the axis of said bar, a fine resilient wire being secured to and supported by each of said supports, each of said wires having a pointed end and a bend forming an acute angle and substantially straight portions between said bend and its ends, the angle of said bend and the angle between each wire and its support being so chosen and the relative length of said wire portions being such that the pointed ends of said wires are located above their supporting points and are spaced a predetermined distance which will substantially not vary when said bar is pushed against said pointed ends until said pointed ends exert a predetermined pressure on said body, and a protective housing enclosing said member, said bar, said body and said wires.

13. A semi-conductor device adapted to provide an amplifier or oscillator and comprising a cylindrical insulating member having a central cylindrical aperture, a semi-conducting body, a metallic bar having a square cross-section, said body being secured and electrically connected to said bar and said bar extending through the aperture in said member and having a press fit therewith, two metallic supports extending through said member, said supports being located in a plane common to the axis of said bar, a fine resilient wire secured to and supported by each of said supports, each of said wires having a pointed end and an intermediate bend forming an acute angle and two straight portions of differing lengths, the angle of said bend and the angle between each wire and its support being so chosen and the relative length of said wire portions being such that the pointed ends of said wires are located in a different plane than their supporting points and are spaced a predetermined distance which will substantially not vary when said bar is pushed against said pointed ends until said pointed ends exert a predetermined pressure on said body, and a protective cup-shape housing enclosing said member, said bar, said body and said wires.

14. The method of providing a tungsten wire with a sharp tip which comprises heating an end of said wire in an oxidizing flame to a temperature at which said wire oxidizes and volatilizing the major portion of the formed oxide and removing substantially the remaining portion of said oxide to provide a sharp tip on said wire.

15. The method of providing a fine tungsten wire with a pointed tip which comprises heating a free end of said wire in an oxidizing flame to a temperature at which said wire oxidizes, volatilizing the major portion of the formed oxide by said flame, and removing substantially the remaining portion of said oxide to provide a sharp point on said wire.

16. The method of preparing a contact electrode consisting of a tungsten wire which comprises heating an end of said wire in an oxidizing flame to a temperature at which said wire oxidizes, volatilizing the major portion of the formed oxide by said flame, removing electrolytically substantially the remaining portion of said oxide to provide a sharp point on said wire, and bending said wire for use as a contact electrode.

17. The method of preparing a point electrode consisting of a fine tungsten wire which comprises heating a free end of said wire in an oxidizing flame to a temperature at which said wire oxidizes, volatilizing the major portion of the formed oxide by said flame, removing substantially the remaining portion of said oxide to provide a sharp point on said wire, and bending said wire at an acute angle to render it resilient for use as a point electrode.

GEORGE M. ROSE, JR.

No references cited.